US011961456B2

(12) United States Patent
Son et al.

(10) Patent No.: US 11,961,456 B2
(45) Date of Patent: Apr. 16, 2024

(54) PIXEL CIRCUIT AND DISPLAY APPARATUS INCLUDING THE SAME

(71) Applicant: Samsung Display Co., LTD., Yongin-si (KR)

(72) Inventors: Sungmin Son, Cheonan-si (KR); Jae-Jin Song, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/094,684

(22) Filed: Jan. 9, 2023

(65) Prior Publication Data

US 2023/0316989 A1 Oct. 5, 2023

(30) Foreign Application Priority Data

Apr. 5, 2022 (KR) ........................ 10-2022-0042208

(51) Int. Cl.
*G09G 3/32* (2016.01)

(52) U.S. Cl.
CPC ....... *G09G 3/32* (2013.01); *G09G 2300/0426* (2013.01); *G09G 2300/0842* (2013.01); *G09G 2310/0216* (2013.01); *G09G 2310/0278* (2013.01); *G09G 2320/0233* (2013.01); *G09G 2320/0247* (2013.01)

(58) Field of Classification Search
CPC ............. G09G 3/32; G09G 2300/0426; G09G 2300/0842; G09G 2310/0216; G09G 2310/0278; G09G 2320/0233; G09G 2320/0247; G09G 2300/0819; G09G 2300/0861; G09G 2310/08; G09G 2340/0435; G09G 2300/043; G09G 2300/0809; G09G 2310/0202; H01L 29/7869
See application file for complete search history.

(56) References Cited

U.S. PATENT DOCUMENTS

| | | | | |
|---|---|---|---|---|
| 11,361,713 B1 * | 6/2022 | Fu | G09G 3/3241 | |
| 2006/0208977 A1 * | 9/2006 | Kimura | G09G 3/2014 | 345/76 |
| 2007/0115244 A1 * | 5/2007 | Shin | G09G 3/3266 | 345/100 |
| 2007/0139314 A1 * | 6/2007 | Park | G09G 3/3233 | 345/76 |
| 2008/0170008 A1 * | 7/2008 | Kim | G09G 3/2003 | 345/76 |

(Continued)

FOREIGN PATENT DOCUMENTS

| | | |
|---|---|---|
| KR | 10-2019-0034375 | 4/2019 |
| KR | 10-2019-0083021 | 7/2019 |

(Continued)

*Primary Examiner* — Jose R Soto Lopez
(74) *Attorney, Agent, or Firm* — KILE PARK REED & HOUTTEMAN PLLC

(57) ABSTRACT

A pixel circuit includes a light emitting element, a first transistor, a second transistor, and a third transistor. The first transistor applies a driving current to the light emitting element. The second transistor and the third transistor apply an initialization voltage to a first electrode of the light emitting element. The second transistor and the third transistor are electrically connected to each other in series.

18 Claims, 10 Drawing Sheets

(56) References Cited

U.S. PATENT DOCUMENTS

| | | | | |
|---|---|---|---|---|
| 2012/0019501 | A1* | 1/2012 | Choi | H10K 59/1216 345/76 |
| 2015/0049030 | A1* | 2/2015 | Her | G06F 3/0412 345/173 |
| 2018/0006099 | A1* | 1/2018 | Ka | H10K 59/1213 |
| 2018/0166010 | A1* | 6/2018 | Park | G09G 3/3266 |
| 2018/0174525 | A1* | 6/2018 | Kim | G09G 3/3266 |
| 2018/0308918 | A1* | 10/2018 | Choi | G09G 3/3233 |
| 2019/0172396 | A1* | 6/2019 | Yang | G09G 3/3233 |
| 2019/0206320 | A1* | 7/2019 | Nam | G09G 3/3258 |
| 2019/0305062 | A1* | 10/2019 | Wang | H10K 59/126 |
| 2020/0044009 | A1* | 2/2020 | Kwak | G09G 3/3233 |
| 2021/0065620 | A1* | 3/2021 | Yang | G09G 3/3208 |
| 2021/0201827 | A1* | 7/2021 | Jang | G09G 3/3291 |
| 2021/0248960 | A1* | 8/2021 | Lee | G09G 3/3275 |
| 2021/0264829 | A1* | 8/2021 | Takatori | H04N 25/77 |
| 2022/0028338 | A1* | 1/2022 | Yang | G09G 3/3233 |
| 2022/0165213 | A1* | 5/2022 | Huang | G09G 3/3233 |
| 2022/0199010 | A1* | 6/2022 | Zhao | G09G 3/3233 |
| 2022/0199656 | A1* | 6/2022 | Wang | H01L 27/1255 |
| 2022/0208074 | A1* | 6/2022 | Kim | G09G 3/3241 |
| 2022/0366834 | A1* | 11/2022 | Xia | G09G 3/32 |
| 2022/0383813 | A1* | 12/2022 | Wang | G09G 3/3266 |
| 2022/0406248 | A1* | 12/2022 | Ju | G11C 19/28 |
| 2023/0064771 | A1* | 3/2023 | Cho | G09G 3/3233 |
| 2023/0083238 | A1* | 3/2023 | Wang | G09G 3/2092 345/55 |
| 2023/0096265 | A1* | 3/2023 | Kim | G11C 19/28 345/213 |
| 2023/0117774 | A1* | 4/2023 | Okabe | H01L 27/1255 257/40 |
| 2023/0125275 | A1* | 4/2023 | Mi | G09G 3/3275 345/214 |
| 2023/0133704 | A1* | 5/2023 | Gai | G09G 3/3233 345/691 |
| 2023/0169913 | A1* | 6/2023 | Ryoo | G09G 3/3266 345/55 |

FOREIGN PATENT DOCUMENTS

| | | |
|---|---|---|
| KR | 10-2020-0016425 | 2/2020 |
| KR | 10-2096622 | 4/2020 |

* cited by examiner

PIXEL CIRCUIT AND DISPLAY APPARATUS INCLUDING THE SAME

CROSS-REFERENCE TO RELATED APPLICATION(S)

This application claims priority to and benefits of Korean Patent Application No. 10-2022-0042208 under 35 U.S.C. § 119, filed on Apr. 5, 2022 in the Korean Intellectual Property Office (KIPO), the entire contents of which are incorporated herein by reference.

BACKGROUND

1. Technical Field

Embodiments of the disclosure relate to a pixel circuit and a display apparatus including the pixel circuit. More particularly, embodiments of the disclosure relate to a pixel circuit generating coupling to a first electrode of a light emitting element to improve a display quality of a display panel in a variable frequency driving and a display apparatus including the pixel circuit.

2. Description of the Related Art

Generally, a display apparatus includes a display panel and a display panel driver. The display panel includes gate lines, data lines, emission lines and pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

In a display apparatus supporting a variable frequency driving, a luminance difference may be generated according to a bias degree of a driving switching element, and a flicker may be generated due to the luminance difference or a change of a driving frequency may be recognized by a user due to the luminance difference.

SUMMARY

Embodiments of the disclosure provide a pixel circuit generating coupling to a first electrode of a light emitting element to improve a display quality of a display panel and a display apparatus supporting a variable frequency driving.

Embodiments of the disclosure also provide a display apparatus including the pixel circuit.

In an embodiment of a pixel circuit according to the disclosure, the pixel circuit includes a light emitting element, a first transistor, a second transistor, and a third transistor. The first transistor applies a driving current to the light emitting element. The second transistor and the third transistor apply an initialization voltage to a first electrode of the light emitting element. The second transistor and the third transistor are connected to each other in series.

In an embodiment, the first transistor may be a P-type transistor. The second transistor may be an N-type transistor. The third transistor may be an N-type transistor.

In an embodiment, the first transistor may be a LTPS (low temperature polysilicon) thin film transistor. The second transistor may be an oxide thin film transistor. The third transistor may be an oxide thin film transistor.

In an embodiment, a first control signal applied to a control electrode of the second transistor may be different from a second control signal applied to a control electrode of the third transistor.

In an embodiment, the first control signal may be an emission signal of a present stage. The second control signal may be an emission signal of one of next stages of the present stage.

In an embodiment, in case that the first control signal is an emission signal of an N-th stage, the second control signal may be an emission signal of an N+2-th stage. N is a positive integer.

In an embodiment of a pixel circuit according to the disclosure, the pixel circuit includes a first transistor including a control electrode electrically connected to a first node, an input electrode electrically connected to a second node and an output electrode electrically connected to a third node, a second transistor including a control electrode that receives a data writing gate signal, an input electrode that receives a data voltage and an output electrode electrically connected to the second node, a third transistor including a control electrode that receives a compensation gate signal, an input electrode electrically connected to the first node and an output electrode electrically connected to the third node, a fourth transistor including a control electrode that receives a data initialization gate signal, an input electrode that receives a second initialization voltage and an output electrode electrically connected to the first node, a fifth transistor including a control electrode that receives an emission signal of a present stage, an input electrode that receives a first power voltage and an output electrode electrically connected to the second node, a sixth transistor including a control electrode that receives the emission signal of the present stage, an input electrode electrically connected to the third node and an output electrode electrically connected to a first electrode of a light emitting element, a 7-1-th transistor including a control electrode that receives the emission signal of the present stage, an input electrode electrically connected to a fourth node and an output electrode electrically connected to the first electrode of the light emitting element and a 7-2-th transistor including a control electrode that receives an emission signal of one of next stages of the present stage, an input electrode that receives an initialization voltage and an output electrode electrically connected to the fourth node. A second power voltage is applied to a second electrode of the light emitting element.

In an embodiment, the pixel circuit may further include a storage capacitor including a first end that receives the first power voltage and a second end electrically connected to the first node.

In an embodiment, the pixel circuit may further include a boosting capacitor including a first end that receives the data writing gate signal and a second end electrically connected to the first node.

In an embodiment, the first transistor, the second transistor, the fifth transistor and the sixth transistor may be P-type transistors. The third transistor, the fourth transistor, the 7-1-th transistor and the 7-2-th transistor are N-type transistors.

In an embodiment, the first transistor may further include a second control electrode that receives the first power voltage.

In an embodiment, in a coupling period of an address scan period, the emission signal of the present stage may have a high level, the emission signal of one of the next stages of the present stage may have a low level, the data initialization gate signal may have a low level, the compensation gate signal may have a low level and the data writing gate signal may have a high level.

In an embodiment, in a data initialization period of the address scan period, the emission signal of the present stage may have the high level, the emission signal of one of the next stages of the present stage may have a high level, the data initialization gate signal may have the low level, the compensation gate signal may have the low level and the data writing gate signal may have the high level. In a data writing period of the address scan period, the emission signal of the present stage may have the high level, the emission signal of one of the next stages of the present stage may have the high level, the data initialization gate signal may have the low level, the compensation gate signal may have a high level and the data writing gate signal may have a low level pulse.

In an embodiment, in a coupling period of a self-scan period, the emission signal of the present stage may have a high level, the emission signal of one of the next stages of the present stage may have a low level, the data initialization gate signal may have a low level, the compensation gate signal may have a low level and the data writing gate signal may have a high level.

In an embodiment, in a data initialization period of the self-scan period, the emission signal of the present stage may have the high level, the emission signal of one of the next stages of the present stage may have a high level, the data initialization gate signal may have the low level, the compensation gate signal may have the low level and the data writing gate signal may have the high level. In a data writing period of the self-scan period, the emission signal of the present stage may have the high level, the emission signal of one of the next stages of the present stage may have the high level, the data initialization gate signal may have the low level, the compensation gate signal may have the low level and the data writing gate signal may have a low level pulse.

In an embodiment of a pixel circuit according to the disclosure, the pixel circuit includes a first transistor including a control electrode electrically connected to a first node, an input electrode electrically connected to a second node and an output electrode electrically connected to a third node, a second transistor including a control electrode that receives a data writing gate signal, an input electrode that receives a data voltage and an output electrode electrically connected to the second node, a third transistor including a control electrode that receives a compensation gate signal, an input electrode electrically connected to the first node and an output electrode electrically connected to the third node, a fourth transistor including a control electrode that receives a data initialization gate signal, an input electrode that receives a initialization voltage and an output electrode electrically connected to the first node, a fifth transistor including a control electrode that receives an emission signal of a present stage, an input electrode that receives a first power voltage and an output electrode electrically connected to the second node, a sixth transistor including a control electrode that receives the emission signal of the present stage, an input electrode electrically connected to the third node and an output electrode electrically connected to a first electrode of a light emitting element, a 7-1-th transistor including a control electrode that receives the emission signal of the present stage, an input electrode electrically connected to a fourth node and an output electrode electrically connected to the first electrode of the light emitting element and a 7-2 transistor including a control electrode that receives an emission signal of one of next stages of the present stage, an input electrode that receives the initialization voltage and an output electrode electrically connected to the fourth node. A second power voltage is applied to a second electrode of the light emitting element.

In an embodiment, the first transistor, the second transistor, the fifth transistor and the sixth transistor may be P-type transistors. The third transistor, the fourth transistor, the 7-1-th transistor and the 7-2-th transistor may be N-type transistors.

In an embodiment of a display apparatus according to the disclosure, the display apparatus includes a display panel, a gate driver, a data driver and an emission driver. The display panel includes a pixel. The gate driver provides a gate signal to the pixel. The data driver provides a data voltage to the pixel. The emission driver provides an emission signal to the pixel. The pixel includes a light emitting element, a first transistor and second transistor and a third transistor. The first transistor applies a driving current to the light emitting element. The second transistor and the third transistor apply an initialization voltage to a first electrode of the light emitting element. The second transistor and the third transistor are electrically connected to each other in series.

In an embodiment, the first transistor may be a P-type transistor. The second transistor may be an N-type transistor. The third transistor may be an N-type transistor.

In an embodiment, a first control signal applied to a control electrode of the second transistor may be different from a second control signal applied to a control electrode of the third transistor.

According to the pixel circuit and the display apparatus including the pixel circuit, the pixel includes a first light emitting element initialization switching element and a second light emitting element initialization switching element which apply a light emitting element initialization voltage to the first electrode of the light emitting element and are connected to each other in series. The first light emitting element initialization switching element and the second light emitting element initialization switching element are turned on in different timings by different control signals so that the coupling due to the control signal of the first light emitting element initialization switching element may be generated at the first electrode of the light emitting element.

Due to the coupling, the luminance difference of the pixel according to the bias degree of the driving switching element of the display apparatus supporting the variable frequency driving may be reduced. The luminance difference of the pixel is reduced in the display apparatus supporting the variable frequency driving, so that the flicker may be reduced and the display quality of the display panel may be enhanced.

BRIEF DESCRIPTION OF THE DRAWINGS

The above and other features and advantages of the disclosure will become more apparent by describing in detailed embodiments thereof with reference to the accompanying drawings, in which.

DETAILED DESCRIPTION OF THE EMBODIMENTS

Figure 1:
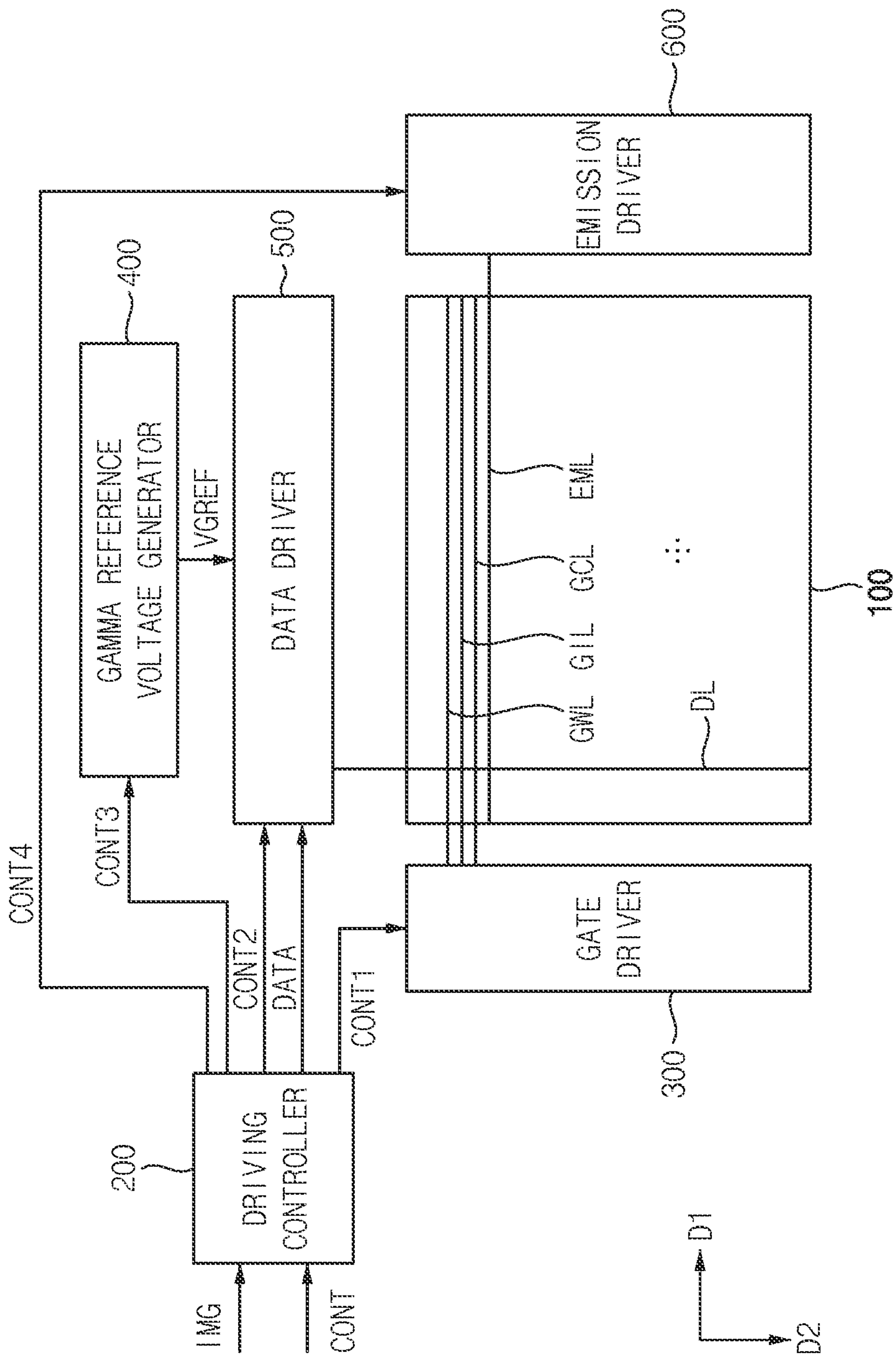
FIG. 1 is a schematic block diagram illustrating a display apparatus according to an embodiment of the disclosure.

Hereinafter, the disclosure will be explained in detail with reference to the accompanying drawings.

Throughout the disclosure, like reference numerals refer to like parts throughout the various figures and embodiments of the disclosure. The sizes of elements in the accompanying drawings may be exaggerated for clarity of illustration. It will be understood that, although the terms “first,” “second,” and the like may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element. In the disclosure, the singular forms are intended to include the plural meanings as well, unless the context clearly indicates otherwise.

Spatially relative terms, such as “beneath,” “below,” “under,” “lower,” “on,” “above,” “upper,” “over,” “higher,” “side” (e.g., as in “sidewall”), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as “below” or “beneath” other elements or features would then be oriented “above” the other elements or features. Thus, the term “below” can encompass both an orientation of above and below. Furthermore, the apparatus may be otherwise oriented (e.g., rotated 90 degrees or at other orientations), and, as such, the spatially relative descriptors used herein should be interpreted accordingly.

When an element, such as a layer, is referred to as being “on,” “connected to,” or “coupled to” another element or layer, it may be directly on, connected to, or coupled to the other element or layer or intervening elements or layers may be present. When, however, an element or layer is referred to as being “directly on,” “directly connected to,” or “directly coupled to” another element or layer, there are no intervening elements or layers present. To this end, the term “connected” may refer to physical, electrical, and/or fluid connection, with or without intervening elements.

The terms “about” or “approximately” as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” may mean within one or more standard deviations, or within ±30%, 20%, 10%, 5% of the stated value.

The term “and/or” includes all combinations of one or more of which associated configurations may define. For example, “A and/or B” may be understood to mean “A, B, or A and B.”

For the purposes of this disclosure, the phrase “at least one of A and B” may be construed as A only, B only, or any combination of A and B. Also, “at least one of X, Y, and Z” and “at least one selected from the group consisting of X, Y, and Z” may be construed as X only, Y only, Z only, or any combination of two or more of X, Y, and Z.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

FIG. 1 is a schematic block diagram illustrating a display apparatus according to an embodiment of the disclosure.

Referring to FIG. 1, the display apparatus may include a display panel 100 and a display panel driver. The display panel driver may include a driving controller 200, a gate driver 300, a gamma reference voltage generator 400, a data driver 500 and an emission driver 600.

The display panel 100 may have a display region on which (or in which) an image is displayed and a peripheral region adjacent to the display region.

The display panel 100 may include gate lines GWL, GIL and GCL, data lines DL, emission lines EML and pixels electrically connected to the gate lines GWL, GIL and GCL, the data lines DL and the emission lines EML. The gate lines GWL, GIL and GCL may extend in a first direction D1, the data lines DL may extend in a second direction D2 intersecting the first direction D1, and the emission lines EML may extend in the first direction D1.

The driving controller 200 may receive input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, a fourth control signal CONT4 and a data signal DATA based on the input image data IMG and the input control signal CONT.

The driving controller 200 may generate the first control signal CONT1 for controlling an operation of the gate driver 300 based on the input control signal CONT, and may output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and may output the third control signal CONT3 to the gamma reference voltage generator 400.

The driving controller 200 may generate the fourth control signal CONT4 for controlling an operation of the emission driver 600 based on the input control signal CONT, and may output the fourth control signal CONT4 to the emission driver 600.

The gate driver 300 may generate gate signals for driving the gate lines GWL, GIL and GCL in response to the first control signal CONT1 received from the driving controller 200. The gate driver 300 may output the gate signals to the gate lines GWL, GIL and GCL. The gate signals may include a data initialization gate signal, a compensation gate signal and a data writing gate signal.

In an embodiment of the disclosure, the gate driver 300 may be integrated on (or in) the peripheral region of the display panel 100. In an embodiment of the disclosure, the gate driver 300 may be mounted on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to a level of the data signal DATA.

In an embodiment, the gamma reference voltage generator 400 may be disposed in the driving controller 200, or in the data driver 500.

The data driver 500 may receive the second control signal CONT2 and the data signal DATA from the driving controller 200, and may receive the gamma reference voltages VGREF from the gamma reference voltage generator 400. The data driver 500 may convert the data signal DATA into data voltages of an analog type using the gamma reference voltages VGREF. The data driver 500 may output the data voltages to the data lines DL.

In an embodiment of the disclosure, the data driver 500 may be integrated on the peripheral region of the display panel 100. In an embodiment of the disclosure, the data driver 500 may be mounted on the peripheral region of the display panel 100.

The emission driver 600 may generate emission signals for driving the emission lines EML in response to the fourth control signal CONT4 received from the driving controller 200. The emission driver 600 may output the emission signals to the emission lines EML.

In an embodiment of the disclosure, the emission driver 600 may be integrated on the peripheral region of the display panel 100. In an embodiment of the present inventive concept, the emission driver 600 may be mounted on the peripheral region of the display panel 100.

Although FIG. 1 illustrates that the gate driver 300 is disposed at a first side of the display panel 100 and the emission driver 600 is disposed at a second side of the display panel 100 opposite to the first side for convenience of explanation, the disclosure is not limited thereto. For example, both of the gate driver 300 and the emission driver 600 may be disposed at the first side of the display panel 100. For example, the gate driver 300 and the emission driver 600 may be integrally formed (or may be integral with each other).

Figure 2:
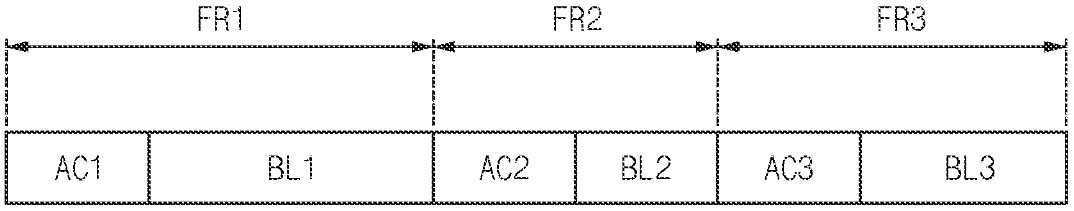
FIG. 2 is a schematic conceptual diagram illustrating a driving frequency of a display panel of FIG. 1.

FIG. 2 is a schematic conceptual diagram illustrating a driving frequency of the display panel 100 of FIG. 1.

Referring to FIGS. 1 and 2, the display panel 100 may be driven in a variable frequency. A first frame FR1 having a first frequency may include a first active period AC1 and a first blank period BL1. A second frame FR2 having a second frequency different from the first frequency may include a second active period AC2 and a second blank period BL2. A third frame FR3 having a third frequency different from the first frequency and the second frequency may include a third active period AC3 and a third blank period BL3.

The first active period AC1 and the second active period AC2 may have substantially a same length. The first blank period BL1 and the second blank period BL2 may have different lengths.

The second active period AC2 and the third active period AC3 may have substantially a same length. The second blank period BL2 and the third blank period BL3 may have different lengths.

The display apparatus supporting the variable frequency driving may include an address scan period in which the data voltage is written to the pixel and a self-scan period in which only light emission is operated without writing the data voltage to the pixel. The address scan period may be in the active period (e.g., first to third active periods AC1, AC2 and AC3). The self-scan period may be in the blank period (e.g., first to third blank periods BL1, BL2 and BL3).

Figure 3:
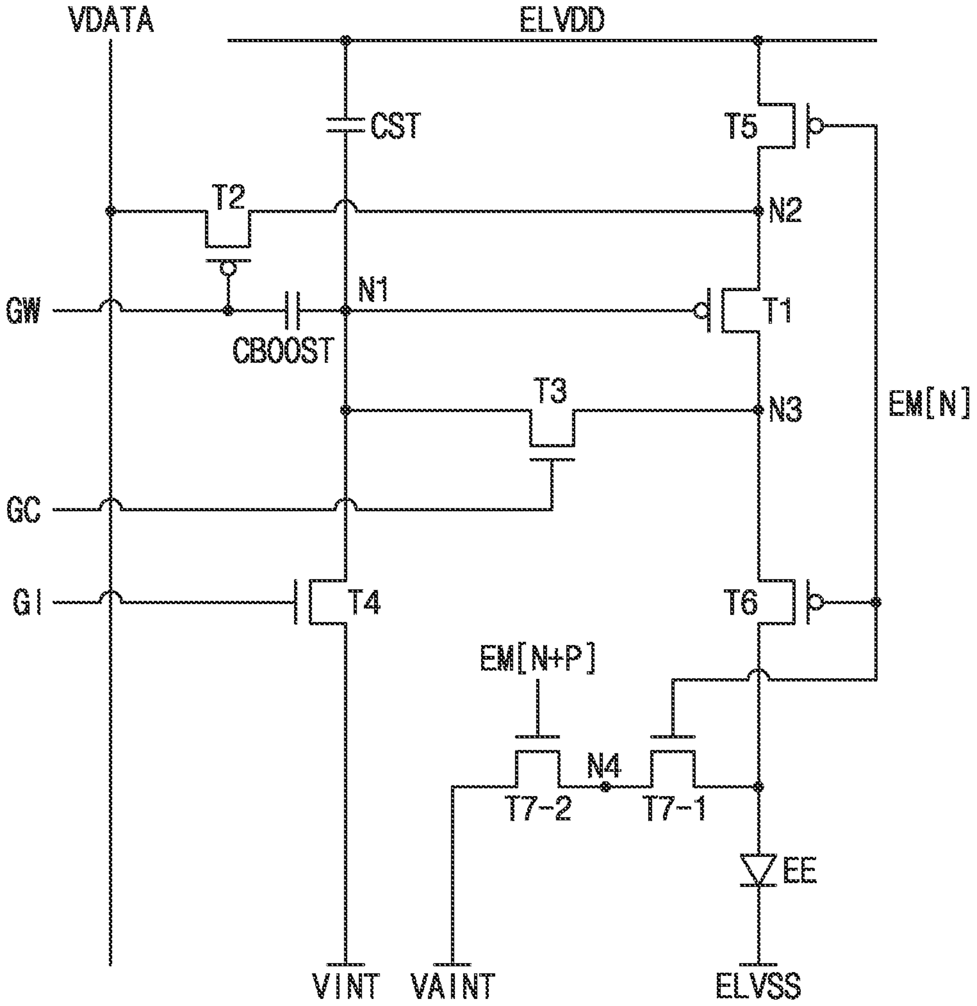
FIG. 3 is a schematic diagram of an equivalent circuit of a pixel of the display panel of FIG. 1.

FIG. 3 is a schematic diagram of an equivalent circuit of an example of a pixel of the display panel 100 of FIG. 1.

Referring to FIGS. 1 to 3, the pixel circuit may include a light emitting element (or light emitting diode) EE, a driving switching element T1, a first light emitting element initialization switching element T7-1 and a second light emitting element initialization switching element T7-2. The driving switching element T1 may apply a driving current to the light emitting element EE. The first light emitting element initialization switching element T7-1 and the second light emitting element initialization switching element T7-2 may apply an initialization voltage VAINT to a first electrode of the light emitting element EE. The first light emitting element initialization switching element T7-1 and the second light emitting element initialization switching element T7-2 may be connected to each other in series.

For example, the driving switching element T1 may be a P-type transistor. For example, the first light emitting element initialization switching element T7-1 may be an N-type transistor. For example, the second light emitting element initialization switching element T7-2 may be an N-type transistor. For example, the driving switching element T1 may be a LTPS (low temperature polysilicon) thin film transistor. For example, the first light emitting element initialization switching element T7-1 may be an oxide thin film transistor. For example, the second light emitting element initialization switching element T7-2 may be an oxide thin film transistor. However, the embodiments are not limited thereto.

A first control signal EM[N] applied to a control electrode of the first light emitting element initialization switching element T7-1 may be different from a second control signal EM[N+P] applied to a control electrode of the second light emitting element initialization switching element T7-2. For example, the first control signal may be an emission signal EM[N] of a present stage. For example, the second control signal may be an emission signal EM[N+P] of one of next stages of the present stage. For example, in case that the first control signal is the emission signal EM[N] of an N-th stage, the second control signal may be the emission signal EM[N+2] of an N+2-th stage. Herein, N is a positive integer, and P is a positive integer.

The first light emitting element initialization switching element T7-1 and the second light emitting element initialization switching element T7-2 may be turned on in different timings by different control signals EM[N] and EM[N+P] so that the coupling due to the control signal EM[N] of the first light emitting element initialization switching element T7-1 may be generated (or may occur) at the first electrode of the light emitting element EE. Due to the coupling, the luminance difference of the pixel according to the bias degree of the driving switching element T1 of the display apparatus supporting the variable frequency driving may be reduced.

Hereinafter, a structure of the pixel is explained in detail. The pixel circuit may include a first transistor T1 including a control electrode connected to a first node N1, an input electrode connected to a second node N2 and an output electrode connected to a third node N3, a second transistor T2 including a control electrode receiving a data writing gate signal GW, an input electrode receiving the data voltage VDATA and an output electrode connected to the second node N2, a third transistor T3 including a control electrode receiving a compensation gate signal GC, an input electrode connected to the first node N1 and an output electrode connected to the third node N3, a fourth transistor T4 including a control electrode receiving a data initialization gate signal GI, an input electrode receiving a second initialization voltage VINT and an output electrode connected to the first node N1, a fifth transistor T5 including a control electrode receiving the emission signal EM[N] of the present stage, an input electrode receiving a first power voltage ELVDD and an output electrode connected to the second node N2, a sixth transistor T6 including a control electrode receiving the emission signal EM[N] of the present stage, an input electrode connected to the third node N3 and an output electrode connected to the first electrode of the light emitting element EE, a 7-1-th transistor T7-1 including a control electrode receiving the emission signal EM[N] of the present stage, an input electrode connected to a fourth node N4 and an output electrode connected to the first electrode of the light emitting element EE and a 7-2-th transistor T7-2 including a control electrode receiving the emission signal EM[N+P] of one of the next stages of the present stage, an input electrode receiving the initialization voltage VAINT and an output electrode connected to the fourth node N4. A second power voltage ELVSS may be applied to a second electrode of the light emitting element EE.

Herein, the driving switching element T1 may be the first transistor T1. The first light emitting element initialization switching element T7-1 may be the 7-1-th transistor T7-1. The second light emitting element initialization switching element T7-2 may be the 7-2-th transistor T7-2.

Herein, the first electrode of the light emitting element EE may be an anode electrode and a second electrode of the light emitting element EE may be a cathode electrode.

In the disclosure, the input electrodes and the output electrodes of the transistors T1, T2, T3, T4, T5, T6, T7-1 and T7-2 may be arbitrarily named for convenience of explanation, and may be named vice versa.

The pixel circuit may further include a storage capacitor CST including a first end receiving the first power voltage ELVDD and a second end connected to the first node N1. For example, the storage capacitor CST may stably maintain the voltage of the control electrode of the driving switching element T1.

In an embodiment, the pixel circuit may further include a boosting capacitor CBOOST including a first end receiving the data writing gate signal GW and a second end connected to the first node N1.

The pixel circuit may include switching elements having different types. For example, the first transistor T1, the second transistor T2, the fifth transistor T5 and the sixth transistor T6 may be P-type transistors. For example, the third transistor T3, the fourth transistor T4, the 7-1-th transistor T7-1 and the 7-2-th transistor T7-2 may be N-type transistors. However, the embodiments are not limited thereto.

The third transistor T3 and the fourth transistor T4 may be N-type transistors so that a current leakage at the control electrode and the output electrode of the driving switching element T1 may be reduced. In case that the current leakage at the control electrode and the output electrode of the driving switching element T1 is reduced, the luminance difference due to the current leakage according to the driving frequency may be prevented so that the flicker may be reduced and the change of the driving frequency may not be shown to a user. Therefore, the display quality of the display apparatus supporting low frequency driving and the variable frequency driving may be enhanced.

In the embodiment, the light emitting element initialization voltage VAINT applied to the input electrode of the 7-2-th transistor T7-2 may be different from the initialization voltage VINT applied to the input electrode of the fourth transistor T4. The voltage for initializing the anode electrode of the light emitting element EE and the voltage for initializing the control electrode of the driving switching element T1 may be set differently so that the accuracy of the initialization of the anode electrode of the light emitting element EE and the accuracy of the initialization of the driving switching element T1 may be enhanced.

Figure 4:
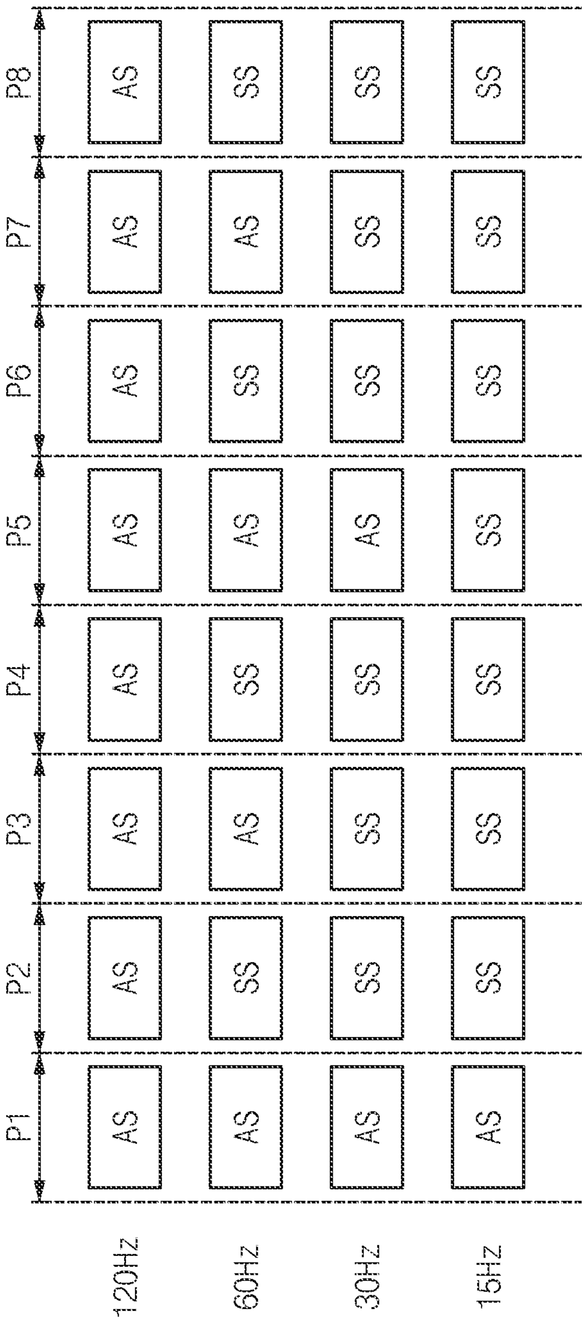
FIG. 4 is a schematic conceptual diagram illustrating a variable frequency driving of the display panel of FIG. 1.
Figure 5:
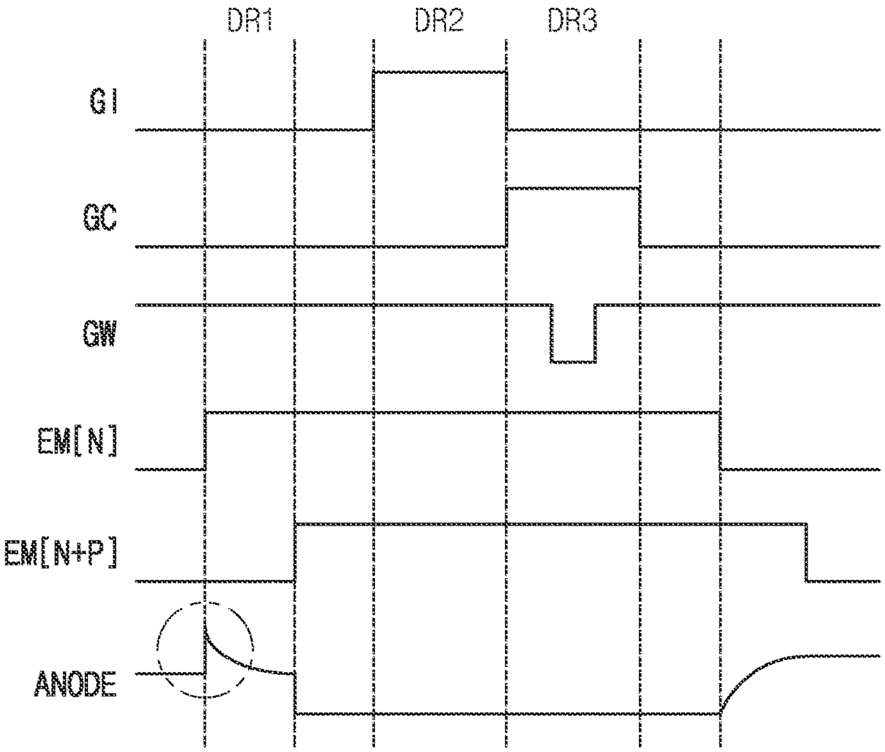
FIG. 5 is a schematic timing diagram illustrating an example of input signals applied to the pixel of FIG. 3 and a node signal of the pixel of FIG. 3 in an address scan period.
Figure 6:
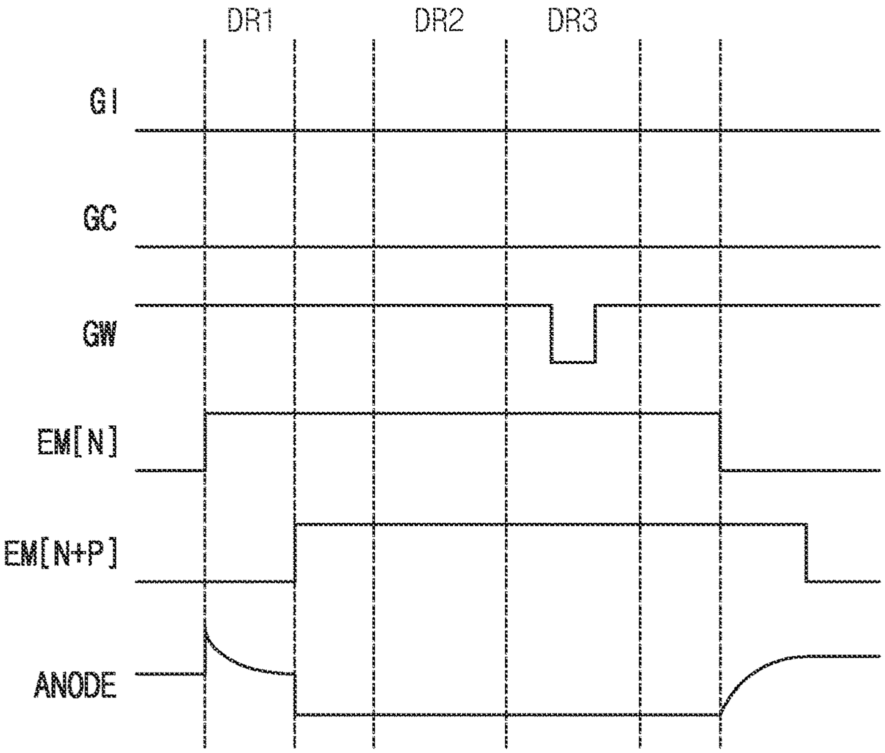
FIG. 6 is a schematic timing diagram illustrating an example of input signals applied to the pixel of FIG. 3 and a node signal of the pixel of FIG. 3 in a self-scan period.

FIG. 4 is a schematic conceptual diagram illustrating a variable frequency driving of the display panel 100 of FIG. 1. FIG. 5 is a schematic timing diagram illustrating an example of input signals applied to the pixel of FIG. 3 and a node signal of the pixel of FIG. 3 in an address scan period AS. FIG. 6 is a schematic timing diagram illustrating an example of input signals applied to the pixel of FIG. 3 and a node signal of the pixel of FIG. 3 in a self-scan period SS.

Referring to FIGS. 1 to 6, the display panel 100 is driven in a variable frequency. The display panel 100 may be driven in a maximum driving frequency of about 120 Hz.

For example, in case that the display panel 100 is driven in (or at) about 120 Hz, first to eighth periods P1 to P8 may be the address scan periods AS.

For example, in case that the display panel 100 is driven in about 60 Hz, a ratio between the address scan period AS and the self-scan period SS may be about 1:1. For example, in case that the display panel 100 is driven in about 60 Hz, the first period P1, the third period P3, the fifth period P5 and the seventh period P7 may be the address scan periods and the second period P2, the fourth period P4, the sixth period P6 and the eighth period P8 may be the self-scan periods SS.

For example, in case that the display panel 100 is driven in about 30 Hz, a ratio between the address scan period AS and the self-scan period SS may be about 1:3. For example, in case that the display panel 100 is driven in about 30 Hz, the first period P1 and the fifth period P5 may be the address scan periods AS and the second period P2, the third period P3, the fourth period P4, the sixth period P6, the seventh period P7 and the eighth period P8 may be the self-scan periods SS.

For example, in case that the display panel 100 is driven in about 15 Hz, a ratio between the address scan period AS and the self-scan period SS may be about 1:7. For example, in case that the display panel 100 is driven in about 15 Hz, the first period P1 may be the address scan periods AS and the second period P2, the third period P3, the fourth period P4, the fifth period P5, the sixth period P6, the seventh period P7 and the eighth period P8 may be the self-scan periods SS.

Referring to FIG. 5, in a coupling period DR1 of the address scan period AS, the emission signal EM[N] of the present stage may have a high level, the emission signal EM[N+P] of one of the next stages of the present stage may have a low level, the data initialization gate signal GI may have a low level, the compensation gate signal GC may have a low level and the data writing gate signal GW may have a high level.

In the coupling period DR1 of the address scan period AS, the emission signal EM[N] may have the high level so that the 7-1-th transistor T7-1 may be turned on. In contrast, in the coupling period DR1 of the address scan period AS, the emission signal EM[N+P] may have the low level so that the 7-2-th transistor T7-2 may not be turned on.

In the coupling period DR1 of the address scan period AS, the voltage ANODE of the anode electrode of the light emitting element EE may rise by the coupling with rising of the emission signal EM[N].

In case that the emission signal EM[N+P] rises to a high level, both the 7-1-th transistor T7-1 and the 7-2-th transistor T7-2 may be turned on so that the voltage ANODE of the anode electrode of the light emitting element EE may fall to the initialization voltage VAINT.

In the embodiment, the 7-2-th transistor T7-2 may be turned on later than the 7-1-th transistor T7-1. Accordingly, in case that the 7-1-th transistor T7-1 is turned on, the coupling of the voltage ANODE of the anode electrode of the light emitting element EE may occur.

In a data initialization period DR2 of the address scan period AS, the emission signal EM[N] of the present stage may have the high level, the emission signal EM[N+P] of one of the next stages of the present stage may have a high level, the data initialization gate signal GI may have a high level, the compensation gate signal GC may have the low level and the data writing gate signal GW may have the high level.

In the data initialization period DR2 of the address scan period AS, the fourth transistor T4 may be turned on in response to the data initialization gate signal GI so that the second initialization voltage VINT may be applied to the control electrode of the driving switching element T1 to initialize the control electrode of the driving switching element T1.

In a data writing period DR3 of the address scan period AS, the emission signal EM[N] of the present stage may have the high level, the emission signal EM[N+P] of one of the next stages of the present stage may have the high level, the data initialization gate signal GI may have the low level, the compensation gate signal GC may have a high level and the data writing gate signal GW may have a low level pulse.

In the data writing period DR3 of the address scan period AS, the data initialization gate signal GI may decrease to the low level so that the fourth transistor T4 may be turned off and the third transistor T3 may be turned on in response to the compensation gate signal GC.

In case that the data writing gate signal GW has the low level pulse in the data writing period DR3 of the address scan period AS, the second transistor T2, the first transistor T1 and the third transistor T3 may be turned on so that the data voltage VDATA may be applied to the control electrode of the first transistor T1 through the second transistor T2, the first transistor T1 and the third transistor T3.

In case that the emission signal EM[N] decreases to the low level, the light emitting element EE may emit light based on a driving current determined by the data voltage VDATA applied to the control electrode of the first transistor T1.

The waveforms of the signals in the self-scan period SS and the waveforms of the signals in the address scan period AS may be substantially the same except that the data initialization gate signal GI maintains a low level and the compensation gate signal GC maintains a low level.

A bias voltage may be applied to the input electrode of the second transistor T2 instead of the data voltage VDATA in the self-scan period SS.

For example, in a coupling period DR1 of the self-scan period SS, the emission signal EM[N] of the present stage may have a high level, the emission signal EM[N+P] of one of the next stages of the present stage may have a low level, the data initialization gate signal GI may have a low level, the compensation gate signal GC may have a low level and the data writing gate signal GW may have a high level.

In a data initialization period DR2 of the self-scan period SS, the emission signal EM[N] of the present stage may have the high level, the emission signal EM[N+P] of one of the next stages of the present stage may have a high level, the data initialization gate signal GI may have the low level, the compensation gate signal GC may have the low level and the data writing gate signal GW may have the high level.

In the data initialization period DR2 of the self-scan period SS, the control electrode of the driving switching element T1 may not be initialized.

In a data writing period DR3 of the self-scan period SS, the emission signal EM[N] of the present stage may have the high level, the emission signal EM[N+P] of one of the next stages of the present stage may have the high level, the data initialization gate signal GI may have the low level, the compensation gate signal GC may have the low level and the data writing gate signal GW may have a low level pulse.

In the data writing period DR3 of the self-scan period SS, the third transistor T3 may not be turned on. In contrast, in the data writing period DR3 of the self-scan period SS, the second transistor T2 may be turned on in response to the low level pulse of the data writing gate signal GW so that the bias voltage may be applied to the second node N2.

In case that the bias voltage applied to the second node N2 in the self-scan period SS is properly set, the pixel may represent a luminance similar to a luminance of the pixel in the address scan period AS. In contrast, in case that the bias voltage applied to the second node N2 in the self-scan period SS is not properly set, the pixel in the self-scan period SS may represent a luminance different from a luminance of the pixel in the address scan period AS so that the flicker may be generated due to the luminance difference.

Figure 7:
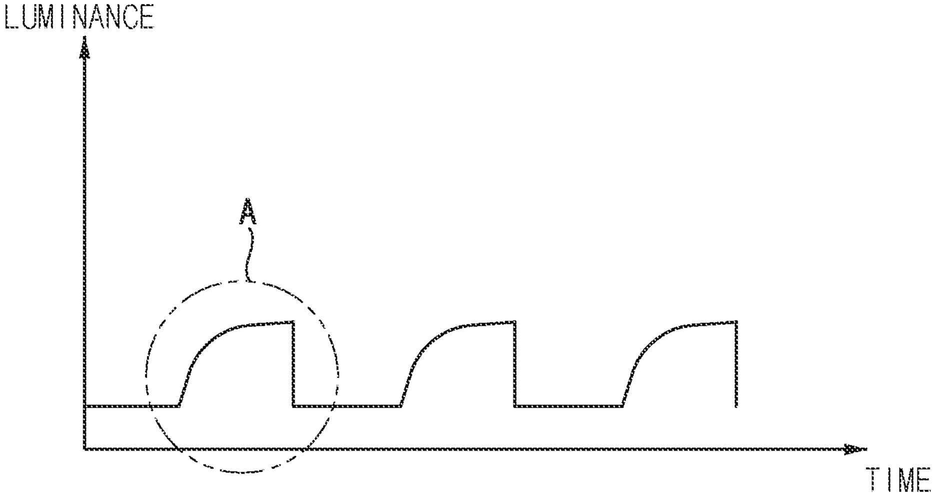
FIG. 7 is a schematic waveform diagram illustrating a luminance of a pixel according to a comparative embodiment.
Figure 8:
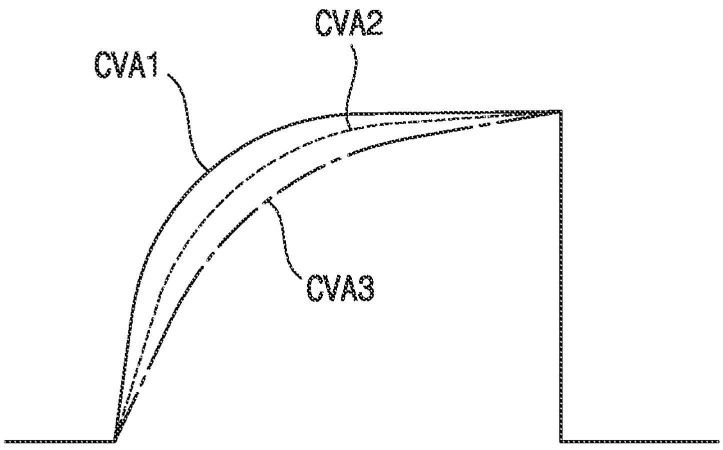
FIG. 8 is a schematic enlarged waveform diagram illustrating a portion A of FIG. 7.
Figure 9:
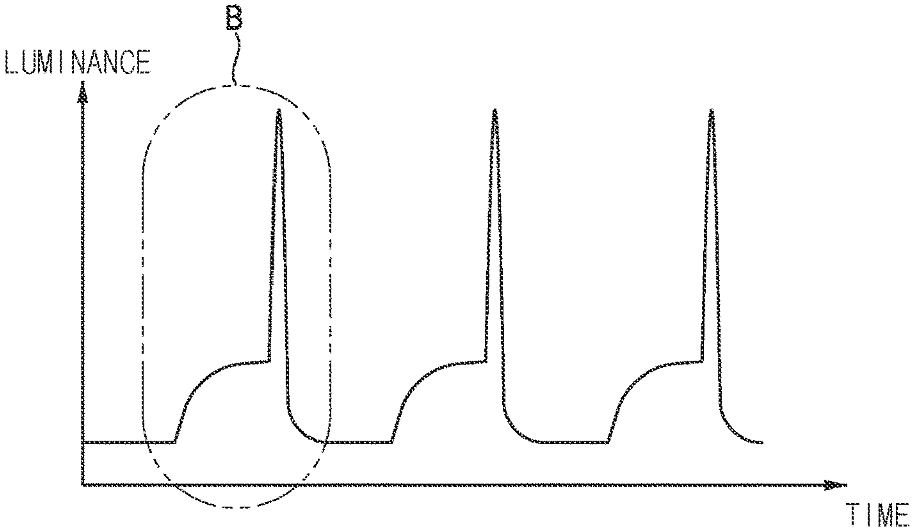
FIG. 9 is a schematic waveform diagram illustrating a luminance of the pixel of FIG. 3.
Figure 10:
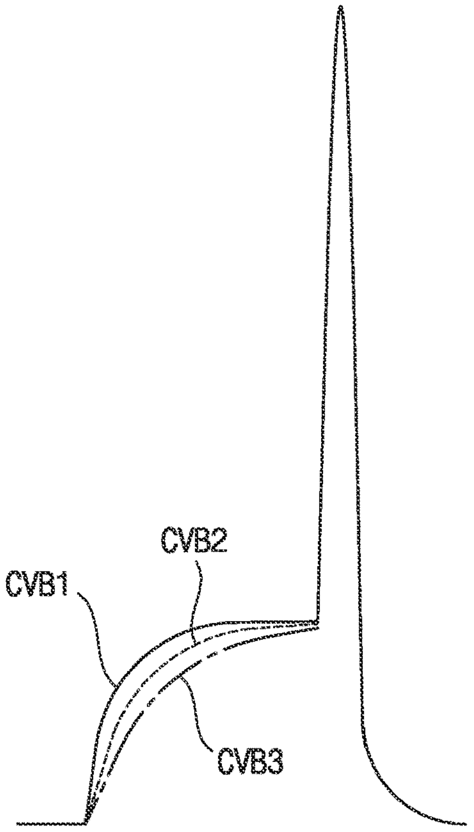
FIG. 10 is a schematic enlarged waveform diagram illustrating a portion B of FIG. 9.

FIG. 7 is a schematic waveform diagram illustrating a luminance of a pixel according to a comparative embodiment. FIG. 8 is a schematic enlarged waveform diagram illustrating portion A of FIG. 7. FIG. 9 is a schematic waveform diagram illustrating a luminance of the pixel of FIG. 3. FIG. 10 is a schematic enlarged waveform diagram illustrating portion B of FIG. 9.

FIGS. 7 and 8 illustrate a case in which the pixel does not include the first light emitting element initialization switching element T7-1 and the second light emitting element initialization switching element T7-2 which are turned on in different timings and connected to each other in series so that the coupling between the emission signal EM[N] and the voltage at the anode electrode of the light emitting element EE is not generated.

FIG. 8 illustrates that the luminance of the pixel may represent a first curve CVA1, a second curve CVA2 and a third curve CVA3 according to the bias voltage of the driving switching element T1 in the self-scan period SS. For example, the luminance of the pixel may represent the first curve CVA1 according to a first bias voltage, the luminance of the pixel may represent the second curve CVA2 according to a second bias voltage and the luminance of the pixel may represent the third curve CVA3 according to a third bias voltage. The luminance difference may be generated according to the bias degree of the driving switching element T1 and the luminance difference may be visually recognized by a user as a flicker. An optimal value of the bias voltage may vary according to the driving frequency so that it may be impossible to select an appropriate bias voltage which does not generate a flicker at various driving frequencies in the display apparatus supporting the variable frequency.

FIGS. 9 and 10 illustrate a luminance waveform of the embodiment in which the pixel includes the first light emitting element initialization switching element T7-1 and the second light emitting element initialization switching element T7-2 which are turned on in different timings and connected to each other in series so that the coupling between the emission signal EM[N] and the voltage at the anode electrode of the light emitting element EE is generated.

FIG. 10 illustrates that the luminance of the pixel may represent a fourth curve CVB1, a fifth curve CVB2 and a sixth curve CVB3 according to the bias voltage of the driving switching element T1 in the self-scan period SS. For example, the luminance of the pixel may represent the fourth curve CVB1 according to a first bias voltage, the luminance of the pixel may represent the fifth curve CVB2 according to a second bias voltage and the luminance of the pixel may represent the sixth curve CVB3 according to a third bias voltage. The luminance difference may be generated according to the bias degree of the driving switching element T1. However, in the embodiment, the coupling between the emission signal EM[N] and the voltage at the anode electrode of the light emitting element EE may occur so that the luminance of the pixel may be greatly increased by the coupling in a period. In the embodiment, an effect of the luminance difference according to the bias degree may be reduced by the coupling so that the luminance difference according to the bias degree and the luminance difference according to the driving frequency may not be visually recognized by a user as the flicker.

According to the embodiment, the pixel circuit includes the first light emitting element initialization switching element T7-1 and the second light emitting element initialization switching element T7-2 which apply the light emitting element initialization voltage VAINT to the first electrode of the light emitting element EE and are connected to each other in series. The first light emitting element initialization switching element T7-1 and the second light emitting element initialization switching element T7-2 may be turned on in the different timings by the different control signals so that the coupling due to the control signal of the first light emitting element initialization switching element T7-1 may be generated at the first electrode of the light emitting element EE.

Due to the coupling, the luminance difference of the pixel according to the bias degree of the driving switching element T1 of the display apparatus supporting the variable frequency driving may be reduced. The luminance difference of the pixel may be reduced in the display apparatus supporting the variable frequency driving, so that the flicker may be reduced and the display quality of the display panel 100 may be enhanced.

Figure 11:
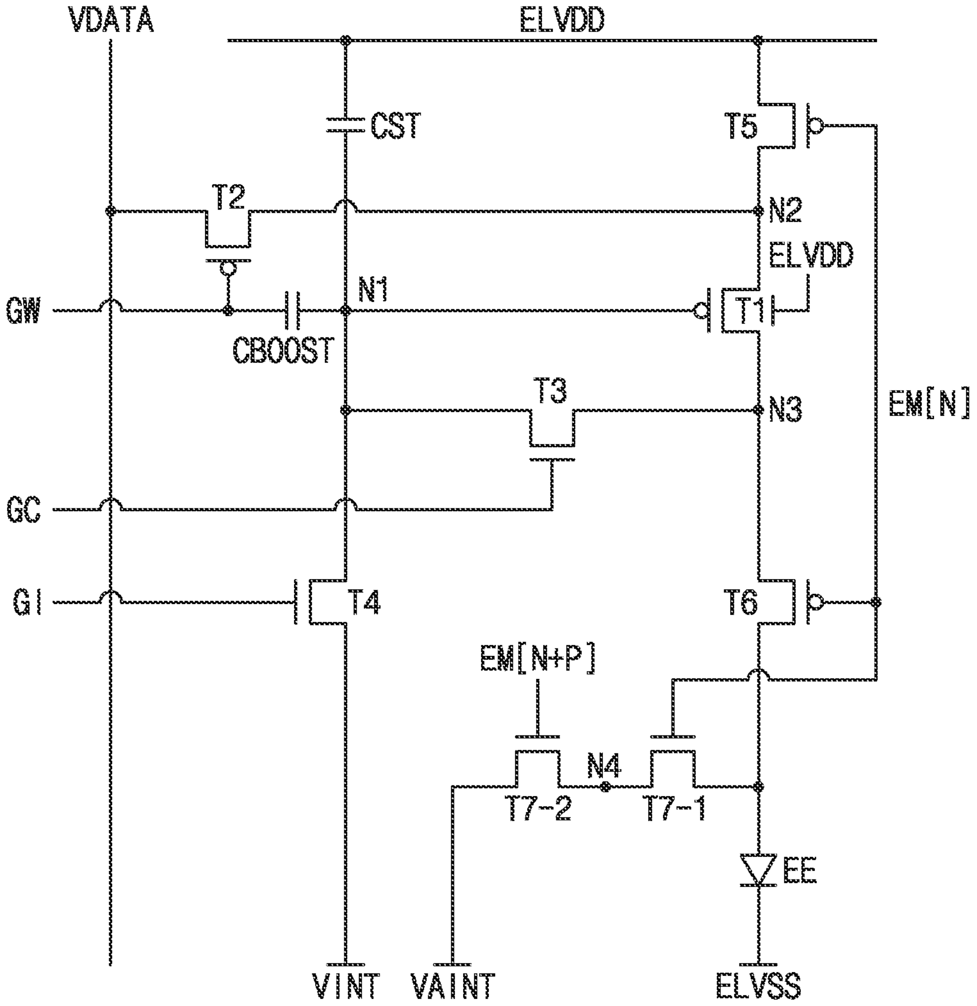
FIG. 11 is a schematic diagram of an equivalent circuit of a pixel of a display panel of a display apparatus according to an embodiment of the disclosure.

FIG. 11 is a schematic diagram of an equivalent circuit of a pixel of a display panel of a display apparatus according to an embodiment of the disclosure.

The pixel circuit according to the embodiment may be distinguishable from the pixel circuit of FIG. 3 at least in that the first transistor T1 further includes a second control electrode. Thus, the same reference numerals will be used to refer to the same or like parts as those described in the previous embodiment of FIG. 3 and any repetitive explanation concerning the above elements will be omitted.

Referring to FIGS. 1, 2 and 4 to 11, the pixel circuit may include a light emitting element EE, a driving switching element T1, a first light emitting element initialization switching element T7-1 and a second light emitting element initialization switching element T7-2. The driving switching element T1 may apply a driving current to the light emitting element EE. The first light emitting element initialization switching element T7-1 and the second light emitting element initialization switching element T7-2 may apply an initialization voltage VAINT to a first electrode of the light emitting element EE. The first light emitting element initialization switching element T7-1 and the second light emitting element initialization switching element T7-2 may be connected to each other in series.

For example, the driving switching element T1 may be a P-type transistor. For example, the first light emitting element initialization switching element T7-1 may be an N-type transistor. For example, the second light emitting element initialization switching element T7-2 may be an N-type transistor. For example, the driving switching element T1 may be a LTPS (low temperature polysilicon) thin film transistor. However, the embodiments are not limited thereto.

Hereinafter, a structure of the pixel is explained in detail. The pixel circuit may include a first transistor T1 including a control electrode connected to a first node N1, an input electrode connected to a second node N2 and an output electrode connected to a third node N3, a second transistor T2 including a control electrode receiving a data writing gate signal GW, an input electrode receiving the data voltage VDATA and an output electrode connected to the second node N2, a third transistor T3 including a control electrode receiving a compensation gate signal GC, an input electrode connected to the first node N1 and an output electrode connected to the third node N3, a fourth transistor T4 including a control electrode receiving a data initialization gate signal GI, an input electrode receiving a second initialization voltage VINT and an output electrode connected to the first node N1, a fifth transistor T5 including a control electrode receiving the emission signal EM[N] of the present stage, an input electrode receiving a first power voltage ELVDD and an output electrode connected to the second node N2, a sixth transistor T6 including a control electrode receiving the emission signal EM[N] of the present stage, an input electrode connected to the third node N3 and an output electrode connected to the first electrode of the light emitting element EE, a 7-1-th transistor T7-1 including a control electrode receiving the emission signal EM[N] of the present stage, an input electrode connected to a fourth node N4 and an output electrode connected to the first electrode of the light emitting element EE and a 7-2-th transistor T7-2 including a control electrode receiving the emission signal EM[N+P] of one of the next stages of the present stage, an input electrode receiving the initialization voltage VAINT and an output electrode connected to the fourth node N4.

Herein, the driving switching element T1 may be the first transistor T1. The first light emitting element initialization switching element T7-1 may be the 7-1-th transistor T7-1. The second light emitting element initialization switching element T7-2 may be the 7-2-th transistor T7-2.

In the embodiment, the first transistor T1 may further include a second control electrode receiving the first power voltage ELVDD. The first transistor T1 further includes the second control electrode receiving the first power voltage ELVDD so that the stability of the operation of the first transistor T1 may be enhanced.

According to the embodiment, the pixel circuit may include the first light emitting element initialization switching element T7-1 and the second light emitting element initialization switching element T7-2 which apply the light emitting element initialization voltage VAINT to the first electrode of the light emitting element EE and are connected to each other in series. The first light emitting element initialization switching element T7-1 and the second light emitting element initialization switching element T7-2 may be turned on in the different timings by the different control signals so that the coupling due to the control signal of the first light emitting element initialization switching element T7-1 may be generated at the first electrode of the light emitting element EE.

Due to the coupling, the luminance difference of the pixel according to the bias degree of the driving switching element T1 of the display apparatus supporting the variable frequency driving may be reduced. The luminance difference of the pixel is reduced in the display apparatus supporting the variable frequency driving, so that the flicker may be reduced and the display quality of the display panel 100 may be enhanced.

Figure 12:
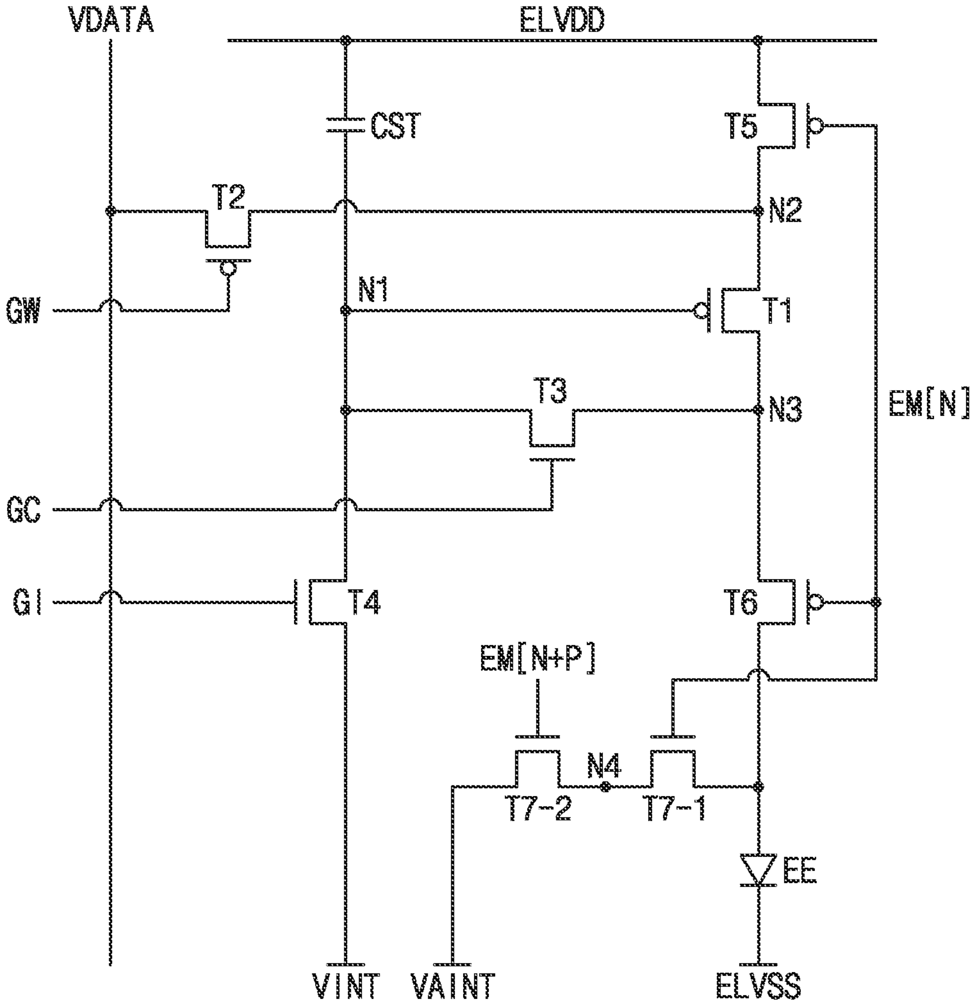
FIG. 12 is a schematic diagram of an equivalent circuit of a pixel of a display panel of a display apparatus according to an embodiment of the disclosure.

FIG. 12 is a schematic diagram of an equivalent circuit of a pixel of a display panel of a display apparatus according to an embodiment of the disclosure.

The pixel circuit according to the embodiment may be distinguishable from the pixel circuit of FIG. 3 at least in that the pixel circuit does not include a boosting capacitor. Thus, the same reference numerals will be used to refer to the same or like parts as those described in the previous embodiment of FIG. 3 and any repetitive explanation concerning the above elements will be omitted.

Referring to FIGS. 1, 2, 4 to 10 and 12, the pixel circuit may include a light emitting element EE, a driving switching element T1, a first light emitting element initialization switching element T7-1 and a second light emitting element initialization switching element T7-2. The driving switching element T1 may apply a driving current to the light emitting element EE. The first light emitting element initialization switching element T7-1 and the second light emitting element initialization switching element T7-2 may apply an initialization voltage VAINT to a first electrode of the light emitting element EE. The first light emitting element initialization switching element T7-1 and the second light emitting element initialization switching element T7-2 may be connected to each other in series.

For example, the driving switching element T1 may be a P-type transistor. For example, the first light emitting element initialization switching element T7-1 may be an N-type transistor. For example, the second light emitting element initialization switching element T7-2 may be an N-type transistor. For example, the driving switching element T1 may be a LTPS (low temperature polysilicon) thin film transistor. However, the embodiments are not limited thereto.

Hereinafter, a structure of the pixel is explained in detail. The pixel circuit includes a first transistor T1 including a control electrode connected to a first node N1, an input electrode connected to a second node N2 and an output electrode connected to a third node N3, a second transistor T2 including a control electrode receiving a data writing gate signal GW, an input electrode receiving the data voltage VDATA and an output electrode connected to the second node N2, a third transistor T3 including a control electrode receiving a compensation gate signal GC, an input electrode connected to the first node N1 and an output electrode connected to the third node N3, a fourth transistor T4 including a control electrode receiving a data initialization gate signal GI, an input electrode receiving a second initialization voltage VINT and an output electrode connected to the first node N1, a fifth transistor T5 including a control electrode receiving the emission signal EM[N] of the present stage, an input electrode receiving a first power voltage ELVDD and an output electrode connected to the second node N2, a sixth transistor T6 including a control electrode receiving the emission signal EM[N] of the present stage, an input electrode connected to the third node N3 and an output electrode connected to the first electrode of the light emitting element EE, a 7-1-th transistor T7-1 including a control electrode receiving the emission signal EM[N] of the present stage, an input electrode connected to a fourth node N4 and an output electrode connected to the first electrode of the light emitting element EE and a 7-2-th transistor T7-2 including a control electrode receiving the emission signal EM[N+P] of one of the next stages of the present stage, an input electrode receiving the initialization voltage VAINT and an output electrode connected to the fourth node N4.

Herein, the driving switching element T1 may be the first transistor T1. The first light emitting element initialization switching element T7-1 may be the 7-1-th transistor T7-1. The second light emitting element initialization switching element T7-2 may be the 7-2-th transistor T7-2.

In the embodiment, the pixel circuit may not include a boosting capacitor CBOOST (see FIG. 3) disposed between a node receiving the data writing gate signal GW and the first node N1.

According to the embodiment, the pixel circuit may include the first light emitting element initialization switching element T7-1 and the second light emitting element initialization switching element T7-2 which apply the light emitting element initialization voltage VAINT to the first electrode of the light emitting element EE and are connected to each other in series. The first light emitting element initialization switching element T7-1 and the second light emitting element initialization switching element T7-2 may be turned on in the different timings by the different control signals so that the coupling due to the control signal of the first light emitting element initialization switching element T7-1 may be generated at the first electrode of the light emitting element EE.

Due to the coupling, the luminance difference of the pixel according to the bias degree of the driving switching element T1 of the display apparatus supporting the variable frequency driving may be reduced. The luminance difference of the pixel is reduced in the display apparatus supporting the variable frequency driving, so that the flicker may be reduced and the display quality of the display panel 100 may be enhanced.

Figure 13:
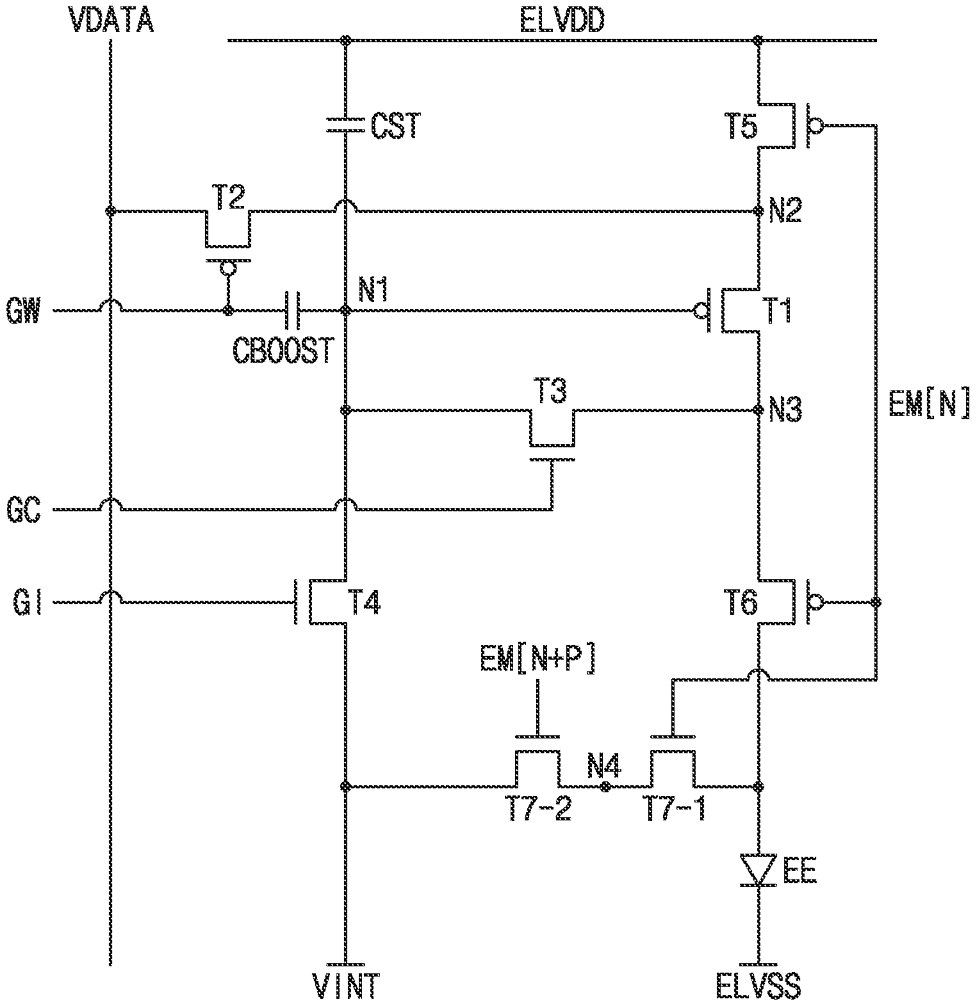
FIG. 13 is a schematic diagram of an equivalent circuit of a pixel of a display panel of a display apparatus according to an embodiment of the disclosure.

FIG. 13 is a schematic diagram of an equivalent circuit of a pixel of a display panel of a display apparatus according to an embodiment of the disclosure.

The pixel circuit according to the embodiment may be distinguishable from the pixel circuit of FIG. 3 at least in that the initialization voltage initializing the control electrode of the driving switching element and the initialization voltage initializing the first electrode of the light emitting element are substantially equal to each other. Thus, the same reference numerals will be used to refer to the same or like parts as those described in the previous embodiment of FIG. 3 and any repetitive explanation concerning the above elements will be omitted.

Referring to FIGS. 1, 2, 4 to 10 and 13, the pixel circuit may include a light emitting element EE, a driving switching element T1, a first light emitting element initialization switching element T7-1 and a second light emitting element initialization switching element T7-2. The driving switching element T1 may apply a driving current to the light emitting element EE. The first light emitting element initialization switching element T7-1 and the second light emitting element initialization switching element T7-2 may apply an initialization voltage VINT to a first electrode of the light emitting element EE. The first light emitting element initialization switching element T7-1 and the second light emitting element initialization switching element T7-2 are connected to each other in series.

For example, the driving switching element T1 may be a P-type transistor. For example, the first light emitting element initialization switching element T7-1 may be an N-type transistor. For example, the second light emitting element initialization switching element T7-2 may be an N-type transistor. For example, the driving switching element T1 may be a LTPS (low temperature polysilicon) thin film transistor. However, the embodiments are not limited thereto.

Hereinafter, a structure of the pixel is explained in detail. The pixel circuit includes a first transistor T1 including a control electrode connected to a first node N1, an input electrode connected to a second node N2 and an output electrode connected to a third node N3, a second transistor T2 including a control electrode receiving a data writing gate signal GW, an input electrode receiving the data voltage VDATA and an output electrode connected to the second node N2, a third transistor T3 including a control electrode receiving a compensation gate signal GC, an input electrode connected to the first node N1 and an output electrode connected to the third node N3, a fourth transistor T4 including a control electrode receiving a data initialization gate signal GI, an input electrode receiving the initialization voltage VINT and an output electrode connected to the first node N1, a fifth transistor T5 including a control electrode receiving the emission signal EM[N] of the present stage, an input electrode receiving a first power voltage ELVDD and an output electrode connected to the second node N2, a sixth transistor T6 including a control electrode receiving the emission signal EM[N] of the present stage, an input electrode connected to the third node N3 and an output electrode connected to the first electrode of the light emitting element EE, a 7-1-th transistor T7-1 including a control electrode receiving the emission signal EM[N] of the present stage, an input electrode connected to a fourth node N4 and an output electrode connected to the first electrode of the light emitting element EE and a 7-2-th transistor T7-2 including a control electrode receiving the emission signal EM[N+P] of one of the next stages of the present stage, an input electrode receiving the initialization voltage VINT and an output electrode connected to the fourth node N4.

Herein, the driving switching element T1 may be the first transistor T1. The first light emitting element initialization switching element T7-1 may be the 7-1-th transistor T7-1. The second light emitting element initialization switching element T7-2 may be the 7-2-th transistor T7-2.

In the embodiment, the light emitting element initialization voltage VINT applied to the input electrode of the 7-2-th transistor T7-2 may be same as the initialization voltage VINT applied to the input electrode of the fourth transistor T4.

According to the embodiment, the pixel circuit may include the first light emitting element initialization switching element T7-1 and the second light emitting element initialization switching element T7-2 which apply the initialization voltage VINT to the first electrode of the light emitting element EE and are connected to each other in series. The first light emitting element initialization switching element T7-1 and the second light emitting element initialization switching element T7-2 may be turned on in the different timings by the different control signals so that the coupling due to the control signal of the first light emitting element initialization switching element T7-1 may be generated at the first electrode of the light emitting element EE.

Due to the coupling, the luminance difference of the pixel according to the bias degree of the driving switching element T1 of the display apparatus supporting the variable frequency driving may be reduced. The luminance difference of the pixel is reduced in the display apparatus supporting the variable frequency driving, so that the flicker may be reduced and the display quality of the display panel 100 may be enhanced.

According to the display apparatus of the embodiment as explained above, the display quality of the display panel may be enhanced.

The above description is an example of technical features of the disclosure, and those skilled in the art to which the disclosure pertains will be able to make various modifications and variations. Thus, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A pixel circuit comprising:
a light emitting element;
a first transistor that applies a driving current to the light emitting element; and
a second transistor and a third transistor that apply an initialization voltage to a first electrode of the light emitting element and electrically connected to each other in series, wherein a first control signal applied to a control electrode of the second transistor is different from a second control signal applied to a control electrode of the third transistor.

2. The pixel circuit of claim 1, wherein
the first transistor is a P-type transistor,
the second transistor is an N-type transistor, and
the third transistor is an N-type transistor.

3. The pixel circuit of claim 2, wherein
the first transistor is a LTPS (low temperature polysilicon) thin film transistor,
the second transistor is an oxide thin film transistor, and
the third transistor is an oxide thin film transistor.

4. The pixel circuit of claim 1, wherein
the first control signal is an emission signal of a present stage, and
the second control signal is an emission signal of one of next stages of the present stage.

5. The pixel circuit of claim 4, wherein
in case that the first control signal is an emission signal of an N-th stage, the second control signal is an emission signal of an N+2-th stage,
N is a positive integer.

6. A pixel circuit comprising:
a first transistor including:
a control electrode electrically connected to a first node;
an input electrode electrically connected to a second node; and
an output electrode electrically connected to a third node;
a second transistor including:
a control electrode that receives a data writing gate signal;
an input electrode that receives a data voltage; and
an output electrode electrically connected to the second node;
a third transistor including:
a control electrode that receives a compensation gate signal;
an input electrode electrically connected to the first node; and
an output electrode electrically connected to the third node;
a fourth transistor including:
a control electrode that receives a data initialization gate signal;
an input electrode that receives a first initialization voltage; and
an output electrode electrically connected to the first node;
a fifth transistor including:
a control electrode that receives an emission signal of a present stage;
an input electrode that receives a first power voltage; and
an output electrode electrically connected to the second node;
a sixth transistor including:
a control electrode that receives the emission signal of the present stage;
an input electrode electrically connected to the third node; and
an output electrode electrically connected to a first electrode of a light emitting element;
a 7-1-th transistor including:
a control electrode that receives the emission signal of the present stage;
an input electrode electrically connected to a fourth node; and
an output electrode electrically connected to the first electrode of the light emitting element; and
a 7-2-th transistor including:
a control electrode that receives an emission signal of one of next stages of the present stage;
an input electrode that receives second initialization voltage; and
an output electrode electrically connected to the fourth node,
wherein a second power voltage is applied to a second electrode of the light emitting element.

7. The pixel circuit of claim 6, further comprising:
a storage capacitor including:
a first end that receives the first power voltage; and
a second end electrically connected to the first node.

8. The pixel circuit of claim 7, further comprising:
a boosting capacitor including:
a first end that receives the data writing gate signal; and
a second end electrically connected to the first node.

9. The pixel circuit of claim 6, wherein
the first transistor, the second transistor, the fifth transistor, and the sixth transistor are P-type transistors, and
the third transistor, the fourth transistor, the 7-1-th transistor and the 7-2-th transistor are N-type transistors.

10. The pixel circuit of claim 6, wherein the first transistor further includes a second control electrode that receives the first power voltage.

11. The pixel circuit of claim 6, wherein in a coupling period of an address scan period:
the emission signal of the present stage has a high level,
the emission signal of one of the next stages of the present stage has a low level,
the data initialization gate signal has a low level,
the compensation gate signal has a low level, and
the data writing gate signal has a high level.

12. The pixel circuit of claim 11, wherein
in a data initialization period of the address scan period:
the emission signal of the present stage has the high level,
the emission signal of one of the next stages of the present stage has a high level,
the data initialization gate signal has the low level,
the compensation gate signal has the low level, and
the data writing gate signal has the high level, and
in a data writing period of the address scan period:
the emission signal of the present stage has the high level,
the emission signal of one of the next stages of the present stage has the high level,
the data initialization gate signal has the low level,
the compensation gate signal has a high level, and
the data writing gate signal has a low level pulse.

13. The pixel circuit of claim 6, wherein in a coupling period of a self-scan period:

the emission signal of the present stage has a high level, the emission signal of one of the next stages of the present stage has a low level, the data initialization gate signal has a low level, the compensation gate signal has a low level, and the data writing gate signal has a high level.

14. The pixel circuit of claim 13, wherein in a data initialization period of the self-scan period:

the emission signal of the present stage has the high level, the emission signal of one of the next stages of the present stage has a high level, the data initialization gate signal has the low level, the compensation gate signal has the low level, and the data writing gate signal has the high level, and in a data writing period of the self-scan period:

the emission signal of the present stage has the high level, the emission signal of one of the next stages of the present stage has the high level, the data initialization gate signal has the low level, the compensation gate signal has the low level, and the data writing gate signal has a low level pulse.

15. A pixel circuit comprising:

a first transistor including:

a control electrode electrically connected to a first node;

an input electrode electrically connected to a second node; and an output electrode electrically connected to a third node;

a second transistor including:

a control electrode that receives a data writing gate signal;

an input electrode that receives a data voltage; and an output electrode electrically connected to the second node;

a third transistor including:

a control electrode that receives a compensation gate signal;

an input electrode electrically connected to the first node; and an output electrode electrically connected to the third node;

a fourth transistor including:

a control electrode that receives a data initialization gate signal;

an input electrode that receives an initialization voltage; and an output electrode electrically connected to the first node;

a fifth transistor including:

a control electrode that receives an emission signal of a present stage;

an input electrode that receives a first power voltage; and an output electrode electrically connected to the second node;

a sixth transistor including:

a control electrode that receives the emission signal of the present stage;

an input electrode electrically connected to the third node; and an output electrode electrically connected to a first electrode of a light emitting element;

a 7-1-th transistor including:

a control electrode that receives the emission signal of the present stage;

an input electrode electrically connected to a fourth node; and an output electrode electrically connected to the first electrode of the light emitting element; and a 7-2-th transistor including:

a control electrode that receives an emission signal of one of next stages of the present stage;

an input electrode that receives the initialization voltage;

and an output electrode electrically connected to the fourth node, wherein a second power voltage is applied to a second electrode of the light emitting element.

16. The pixel circuit of claim 15, wherein the first transistor, the second transistor, the fifth transistor, and the sixth transistor are P-type transistors, and the third transistor, the fourth transistor, the 7-1-th transistor, and the 7-2-th transistor are N-type transistors.

17. A display apparatus comprising:

a display panel including a pixel;

a gate driver that provides a gate signal to the pixel;

a data driver that provides a data voltage to the pixel; and an emission driver that provides an emission signal to the pixel, wherein the pixel comprises:

a light emitting element;

a first transistor that applies a driving current to the light emitting element; and a second transistor and a third transistor that apply an initialization voltage to a first electrode of the light emitting element and electrically connected to each other in series, wherein a first control signal applied to a control electrode of the second transistor is different from a second control signal applied to a control electrode of the third transistor.

18. The display apparatus of claim 17, wherein the first transistor is a P-type transistor, the second transistor is an N-type transistor, and the third transistor is an N-type transistor.

* * * * *